US008425310B2

(12) United States Patent
Soukup et al.

(10) Patent No.: US 8,425,310 B2
(45) Date of Patent: Apr. 23, 2013

(54) SYSTEM AND METHOD FOR TRACKING PATRONS NON-GAMING CASINO SPEND

(75) Inventors: Thomas E. Soukup, Las Vegas, NV (US); Jeffrey George, Las Vegas, NV (US); Steve Sutherland, Henderson, NV (US); Jeffrey Cohn, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 479 days.

(21) Appl. No.: 12/426,059

(22) Filed: Apr. 17, 2009

(65) Prior Publication Data

US 2009/0264188 A1    Oct. 22, 2009

Related U.S. Application Data

(60) Provisional application No. 61/046,046, filed on Apr. 18, 2008.

(51) Int. Cl.
*A63F 9/24* (2006.01)
(52) U.S. Cl.
USPC .............................................. 463/25; 463/42
(58) Field of Classification Search ..................... 463/25, 463/42
See application file for complete search history.

(56) References Cited

U.S. PATENT DOCUMENTS

| 2005/0054438 A1* | 3/2005 | Rothschild et al. | 463/29 |
| 2006/0052161 A1* | 3/2006 | Soukup et al. | 463/27 |
| 2009/0176580 A1* | 7/2009 | Herrmann et al. | 463/43 |

* cited by examiner

*Primary Examiner* — N Drew Richards
*Assistant Examiner* — Yu-Hsi D Sun
(74) *Attorney, Agent, or Firm* — Howard & Howard Attorneys PLLC

(57) ABSTRACT

A system and method for tracking patron events at a plurality of devices is provided. The plurality of devices include electronic gaming machines and non-gaming machines. Each game device has a value associated therewith. The system includes a plurality of player tracking devices and a server or computer. Each player tracking device is associated with one of the electronic gaming machines. The player tracking devices identify patrons interacting with the system, track wagers made by the patrons on the electronic gaming machines and record wager data associated with each wager made by the players and a respective electronic gaming machine in a database. The server receives the wager data and stores the wager data in a database and receives transaction data associated with a transaction associated with the patrons use of the non-gaming devices and stores the transaction data in the database, and establishes a player rating associated with each player as a function of the wager data and the transaction data.

19 Claims, 2 Drawing Sheets

SYSTEM AND METHOD FOR TRACKING PATRONS NON-GAMING CASINO SPEND

CROSS-REFERENCE TO RELATED APPLICATIONS

The present application claims priority to U.S. Provisional Application Ser. No. 61/046,046, filed Apr. 18, 2008, which is incorporated herein by reference.

FIELD OF THE INVENTION

The present invention relates generally to casino management systems, and more particularly, to a casino management system which tracks the non-gaming activities of patrons, stores data related thereto, and establishes a rating related to the relative worth of the patrons as a function thereof.

BACKGROUND OF THE INVENTION

The growth and competition in the casino gaming market in recent years and the increasingly sophisticated and complex technology being integrated into the gaming environment, presents both challenges and opportunities to gaming establishment operators. Over recent years, casino revenue has dramatically increased in the area of non-gaming revenue sources such as, hotel and hospitality, retail, dining, entertainment and other casino products or services. Traditionally, patron tracking systems have focused on tracking patrons of electronic gaming machines, table games and other gaming revenue areas such as, bingo and keno. In this traditional scenario, a patron is identified during gaming play by a patron tracking ID card and/or a patron identification number (PIN). The patron tracking system tracks the patron's gaming play and may award patron tracking points, bonuses, and other incentives according to established criteria to promote continued patron loyalty.

In most cases, the patron tracking points earned by play electronic gaming machines, table games and other gaming revenue areas such as, bingo and keno may be redeemed for prizes, such as complimentary meals, merchandise, hotel and services through non-gaming revenue point-of-sales devices linked to the patron tracking system. In these cases, non-gaming casino revenue patron tracking has been limited to the redemption of points and prizes earned by tracking the patron's play at gaming revenue sources. U.S. Pat. No. 5,655,961 teaches a method whereby patron tracking points are redeemed at a redemption counter in the casino for meals or clothing. The patron tracking points, therefore, are an additional inducement to encourage gaming revenue source play. U.S. Pat. No. 7,303,475 further extends this method whereby patrons can redeem their patron tracking points for non-gaming revenue products and services and can earn patron tracking point based on products or services purchases at remote redemption centers.

As non-gaming revenue increases, methods are needed to track and record the patron's purchases (spend). Further more, methods are needed to establish the profitability of patron's purchases and to rank and score the patron's net worth in the area of non-gaming revenue purchases. Moreover, there is an emerging category of casino patrons who are not members of the traditional casino patron club of electronic gaming machines, tables games or other gaming revenue sources, yet spend large amount of money in non-gaming revenue areas. Traditional patron tracking systems do not track, rate or score this category of patron.

Some casinos utilize an entirely separate system which may be used to store, independently, both player tracking data and other information related to the casino resort patron. The other information may be relate to the patron's transactions or visit, or originate at, the hotel, restaurant(s), retail outlet(s), spa(s), etc. . . . There are several problems with this approach. First, a completely different and additional system is used to receive the player tracking data (from the casino management system or CMS) and the other data and to store it. Secondly, such external systems must be tailored specifically to work with the CMS and other systems, such that the data from these systems is understood. In other words, the data from these systems is typically maintained in different formats and must be translated in order to be understood and stored. This is a very laborious and expensive undertaking. Furthermore, it is also difficult and expensive to maintain. For instance, if one of the underlying system changes, then the additional external system may also require corresponding updates.

The present invention is aimed at one or more of the problem as set forth above.

SUMMARY OF THE INVENTION

In a first aspect of the present invention, a method is established for identifying a patron who purchases products or services such as, hotel and hospitality, retail, dining, entertainment and/or other non-gaming revenue source related to the casino enterprise whether located locally or remote to the casino property. This method may incorporate the patron presenting a patron tracking ID card, providing a phone number, using a credit card associated with the patron's account or any other means of identifying the patron.

In a second aspect of the present invention, a method is established for determining the profitability (rating) patron's purchase. This method incorporates a technique of evaluating the casino's profit margin on the product and/or service and storing this profit evaluation in the patron tracking system. For example, a patron may purchase a spa package at a certain amount, however, the cost of the spa package is known to casino, and therefore at a minimum the patrons purchase price (rating buy-in), value or pre-discounted price (rating actual buy-in), cost of the product or service (rating walk-with) and casino profitability (rating net profit) are recorded in addition to the date and time of the purchase.

In a third aspect of the present invention, a method is established for determining the category and/or score of patron (ranking) of the patron based on their historical spend and as compared with all other non-gaming revenue patrons.

In a fourth aspect of the present invention, a method is established for using the patron rating and ranking information to establish a system for rewarding the patron with complementary patron tracking points, complementary products and services or a combination thereof.

In a fifth aspect of the present invention, a method is established for evaluating the patrons overall net worth to the gaming operator.

In a sixth aspect of the present invention, a method is established for using overall ranking method for rewarding a patron.

In a seventh aspect of the present invention, a system for tracking patron events at a plurality of devices is provided. The plurality of devices include electronic gaming machines and non-gaming machines. Each game device has a value associated therewith. The value associated with the electronic gaming machines is a theoretical hold of the respective electronic gaming machine. The value associated with the non-gaming machines is an estimated profit of the respective non-gaming machine. The system includes a plurality of player tracking devices and a server or computer. Each player tracking device is associated with one of the electronic gaming machines. The player tracking devices identify patrons interacting with the system, track wagers made by the patrons on the electronic gaming machines and record wager data associated with each wager made by the players and a respective electronic gaming machine in a database. The wager data includes a device type associated with respective gaming machine, an electronic gaming machine identifier, the theoretical hold percentage associated with the respective gaming machine, and an amount of the respective wager. The server is in communication with the player tracking devices and the non-gaming machines for receiving the wager data associated with the one of the patrons and the respective gaming machine from the player tracking device and storing the wager data in a database and, for receiving transaction data associated with a transaction associated with the patrons use of the non-gaming devices and storing the transaction data in the database, and for establishing a player rating associated with each player as a function of the wager data and the transaction data.

In an eighth aspect of the present invention, a method for tracking patron events at a plurality of devices, the plurality of devices including electronic gaming machines and non-gaming machines. Each game device has a value associated therewith. The value associated with the electronic gaming machines is a theoretical hold of the respective electronic gaming machine. The value associated with the non-gaming machines is an estimated profit of the respective non-gaming machine. The method includes the steps of identifying patrons interacting with the gaming machines and tracking wagers made by the patrons on the electronic gaming machines, and recording wager data associated with each wager made by the patrons and a respective electronic gaming machine. The wager data includes a device type associated with the respective gaming machine, an electronic gaming machine identifier, the theoretical hold percentage associated with the respective gaming machine, and an amount of the respective wager. The method also includes the steps of receiving the wager data associated with the one of the patrons and the respective gaming machine and storing the wager data in a database, receiving transaction data associated with a transaction associated with the patrons use of the non-gaming devices and storing the transaction data in the database, and establishing a player rating associated with each player as a function of the wager data and the transaction data.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Figure 1:
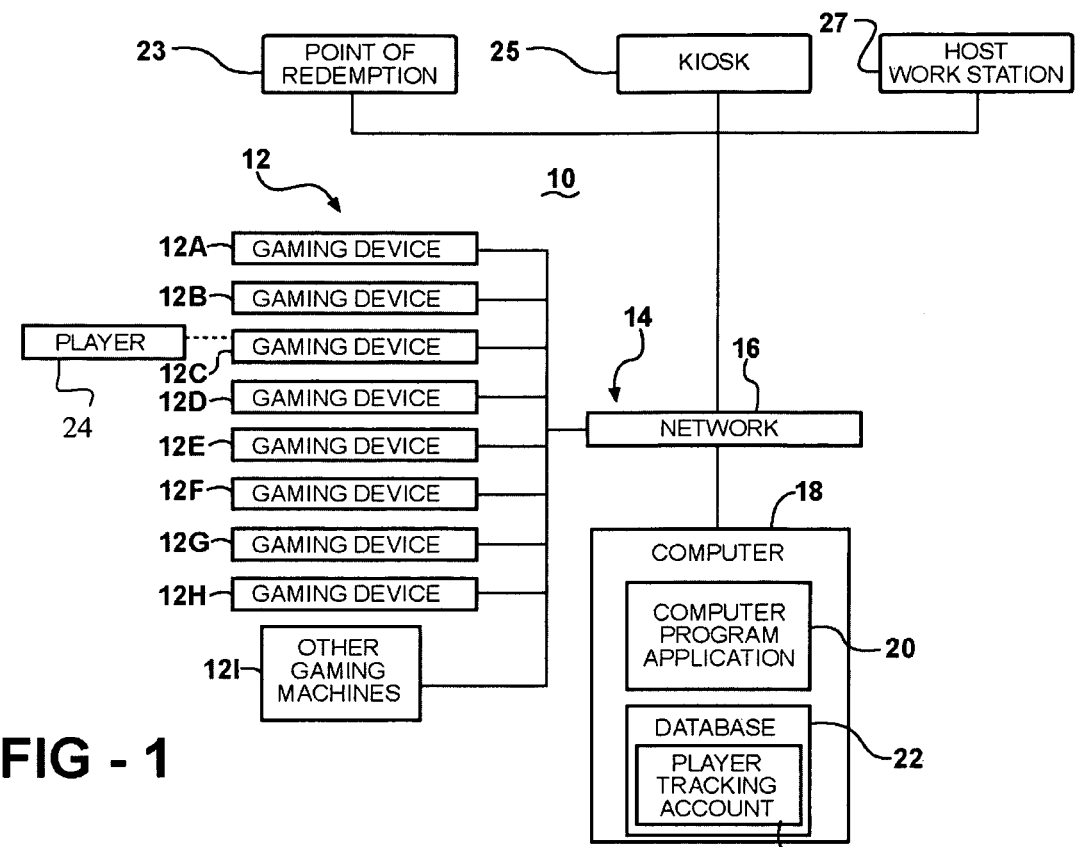
FIG. 1 is block diagram of a system for tracking gaming and non-gaming activities of a patron at a resort, according to an embodiment of the present invention.

Referring to the Figures, wherein like numerals indicate like or corresponding parts throughout the several views, a system 10 for tracking patron events at a plurality of devices 12. In one aspect of the present invention the devices 12 may be gaming machines 12A-12H, 12I or non-gaming machines 12J, 12K,12L. In one aspect of the present invention, the system 10 and method receive information related to the player(s)' and/or patron(s)' use of the devices 12 and establish a player rating based thereon. The player rating may be a single number which reflects a value reflective of the player or patron's relative "worth" to a casino or resort. In one aspect of the present invention, the patron's relative worth may be first established with respect to a plurality of predetermined criteria.

In one embodiment, the predetermined criteria include recency, i.e., how recent has the player or patron used a device 12 or visited the casino or resort, frequency (of visits), monetary value, and profit margin (see below).

In one embodiment, data is gathered regarding the patrons' use of the devices 12 (gaming and non-gaming) and, for a given time period, each patron is scored relative to all other patrons for each criteria. The scores, for example, may be established as percentiles. For example, assuming that there are 100 patrons, if one of the patrons frequented the resort more then all other patrons during the past month, that patron would be in the $99^{th}$ percentile.

For each patron, their percentile score is established for each criterion. The percentile scores are then combined to establish a single value using a predetermined weighting scheme. For example, the single value may be established using:

$$(A*R)+(B*F)+(C*M)+(D*P),$$

where A, B, C, & D are first, second, third and fourth weighting factors and R, F, M & P are the patron's percentile scores for recency, frequency, monetary value, and profit margin. Generally, the weighting factors are set by the casino and may be changed. Sample weighting factors are 15%, 15%, 30%, and 40%, respectively. The single value may be established for different time periods. For example, in one embodiment, the single value may be established for the last month, the last three months, the last 12 months, and lifetime. The single values may be combined, for example, by averaging, to establish a total value.

Any of the single values or the total value may be utilized by the casino for a myriad of purposes (see below).

In one embodiment, the system 10 and method may be embodied or implemented via an entertaining management and monitoring system 14 which is shown in block diagram form in FIG. 1. The entertainment and monitoring system 14 may include additional functions such as, real-time multi-site, slot accounting, player tracking, cage credit and vault, sports book data collection, Point of Sale (POS) accounting, keno accounting, bingo accounting, and table game accounting, a wide area progressive jackpot, and electronic funds transfer (EFT).

As shown, the system 10 includes a plurality of devices 12. Devices 12 may include, but are not limited to gaming machines, electronic gaming machines (such as video slot, video poker machines, or video arcade games), electric gaming machines, virtual gaming machines, e.g., for online gaming, an interface to a table management system (not shown) for table games, kiosks 25, point of sale or redemption terminals 23, or other suitable devices at which a patron may interact or access a user or player account. In the illustrated embodiment, eight electronic gaming devices or machines (EGM) 12A-12H are shown. However, it should be noted that the present invention is not limited to any number or type of machines 12. In one embodiment, the machines 12 are organized into banks (not shown), each bank containing a plurality of machines 12.

Other types of gaming machines which may be included (see above) are indicated with reference number 121.

The devices 12 are connected via a network 16 to one or more host computers or servers 18, which are generally located at a remote or central location. The computer 18 includes a computer program application 20 which maintains one or more databases 22. In one embodiment, the database(s) are Oracle database(s).

The computer program application 20 and databases 22 may be used to record, track, and report accounting information regarding the gaming machines 12 and players of the gaming machines 12. Additionally, the computer program application 20 and database(s) 22 may be used to maintain information related to player or player tracking accounts (see below).

In general, the machines 12 may be used by a user or player, i.e., to access their player account. For example, a gaming machine 12C is playable by a player 24. The player 24 may select one of the gaming machines 12C to play and insert a coin, credit, coupon, and/or player tracking card (not shown) into the chosen EGM 12C. Generally, the gaming machines 12C have an associated number of credits or coins required in order to play. In the case of video slot or poker games, the game is played and an award in the form of credits may be awarded based on a pay table of the gaming machine 12.

Figure 2:
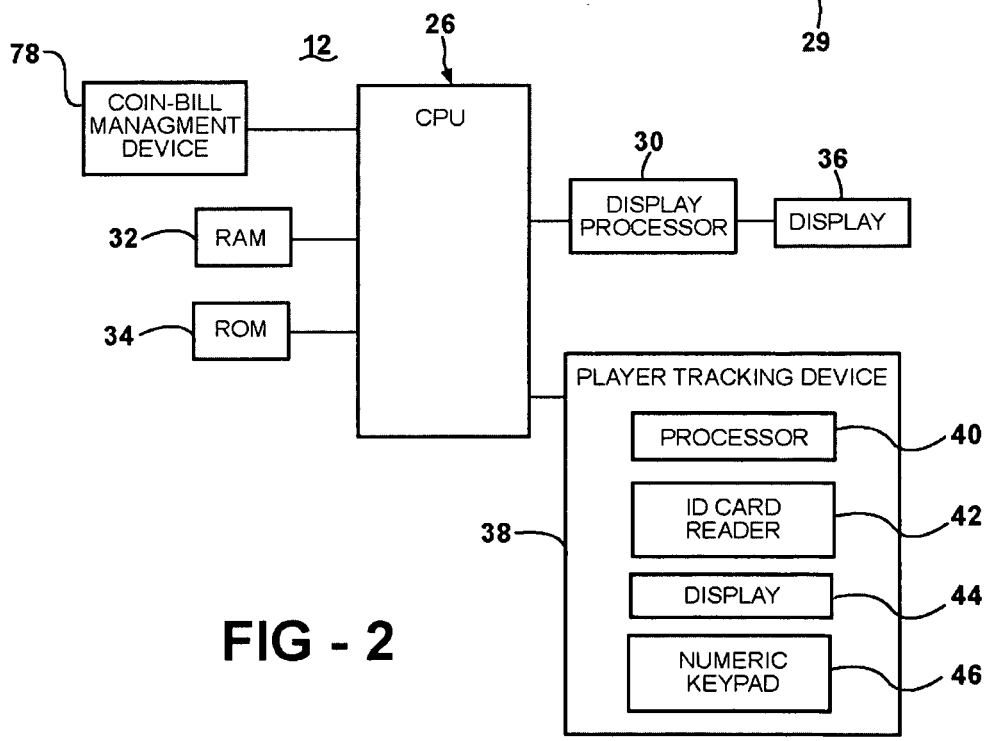
FIG. 2 is a block diagram of a gaming machine for use with the system of FIG. 1.
Figure 3:
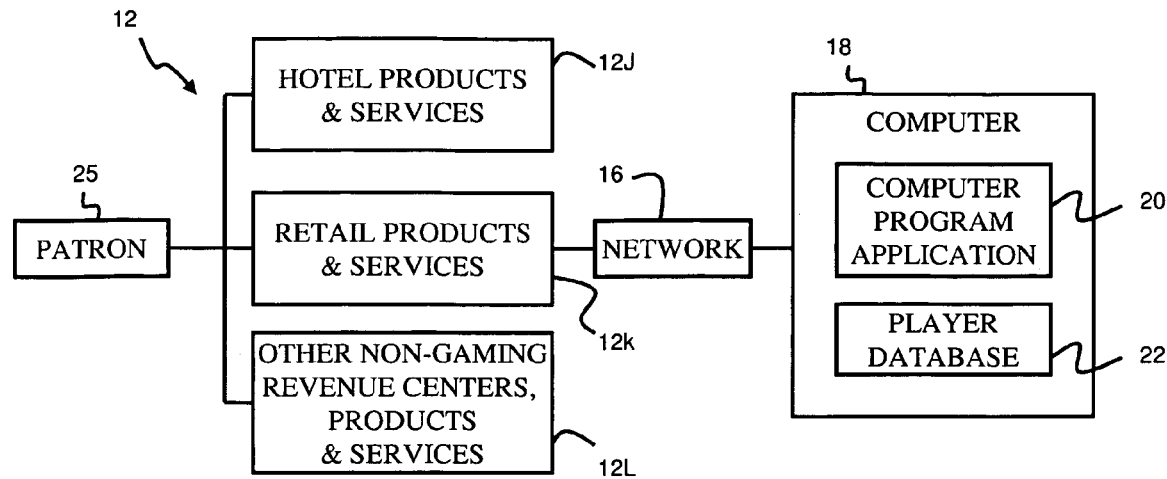
FIG. 3 is a second block diagram of the system of FIG. 1.
Figure 4:
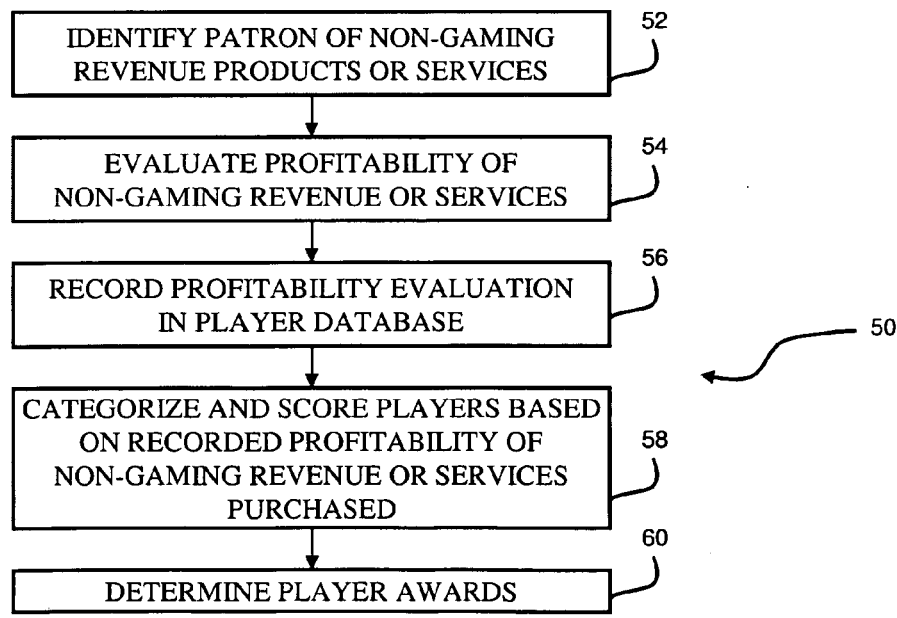
FIG. 4 is a flow diagram of a method for tracking non-gaming activities of a patron at a resort, according to a first embodiment of the present invention.

With reference to FIG. 2, a block diagram of a suitable electronic gaming machine 12C is shown.

The machine 12C comprises a game controller 26, or central processing unit (CPU), a coin-bill management device 28, a display processor 30, a RAM 32 as a memory device and a ROM 34 (generally provided as an EPROM). The CPU 26 is mainly composed of a microprocessor unit and performs various calculations and motion control necessary for the progress of the game. The coin-bill management device 28 detects the insertion of a coin or a bill and performs a necessary process for managing the coin and the bill. The display processor 30 interprets commands issued from the CPU 26 and displays desirable images on a display 36. The RAM 32 temporarily stores programs and data necessary for the progress of the game, and the ROM 34 stores, in advance, programs and data for controlling basic operation of the machine 12C, such as the booting operation thereof, game code and graphics.

Input to the gaming device 12C may be accomplished via mechanical switches or buttons or via a touchscreen interface (not shown). Such gaming machines 12 are well known in the art and are therefore not further discussed.

The player 24 is identified via the player tracking card and/or a player identification number entered into player tracking device 38 at each EGM 12 (see below). Player tracking accounts may be used, generally, to provide bonuses to a player, in addition to the award designated by, in the case of a video slot or poker machine, the EGM's 12 paytable. These bonuses may be awarded to the player 24 based a set of criteria, including, but not limited to, a) the player's play on the machine 12C, b) the player's overall play, c) play during a predetermined period of time, and d) the player's birthday or anniversary, or e) any other definable criteria. Additionally, bonuses may be awarded on a random basis, i.e., to a randomly chosen player or randomly chosen game 12. Bonuses may also be awarded in a discretionary manner or based on other criteria, such as, purchases made at a gift shop or other affiliated location.

In one embodiment, the player tracking device 38 includes a processor 40, a player identification card reader 42 and/or a numeric keypad 44, and a display 46. In one embodiment, the display 46 is a touchscreen panel and the numeric keypad 44 is implemented thereon.

The player 24 may be identified by entry of a player tracking card into the player identification card reader 42 and/or entry of a player identification number (PIN) on the numeric key pad 46. The play tracking device 38 may also be used to communicate information between the computer 18 and the corresponding EGM 12C. The player tracking device 40 may also be used to track bonus points, i.e., incentive points or credits, downloaded from the computer 18.

Each device 12 has a value associated therewith. With respect to the gaming machines 12A-12I, the value is a theoretical hold percentage. The theoretical hold percentage may be defined as the casino or establishment's estimated, average revenue percentage. For example, if the gaming machine 12 is a slot machine, the hold percentage is the expect house's estimate, average take or revenue for a particular machine. For a non-gaming device 12, e.g., a point of sale terminal, such as a cash register, a restaurant, or a spa, the theoretical hold percentage may be set to an estimated profit percentage for the given device 12. In one aspect of the present invention, each player tracking device 12 is associated with one of the electronic gaming machines 12A-12I. The player tracking devices 12 identify patrons interacting with the system 12, for track wagers made by the players on the electronic gaming machines 12A-12I and record wager data associated with each wager made by the player and a respective electronic gaming machine 12A-12I. In one embodiment, the wager data includes a device type associated with respective gaming machine, an electronic gaming machine identifier, the theoretical hold percentage associated with the respective gaming machine, and an amount of the respective wager. The wager data may also include a player ID and a date/time stamp.

The computer or server 18 is in communication with the player tracking devices 38 and the non-gaming machines 12J, 12K, 12L for receiving the wager data associated with the patrons and the respective gaming machine 12A-12I from the player tracking device 38 and storing the wager data in a database and, for receiving transaction data associated with a transaction associated with the patrons' use of the non-gaming devices 12J, 12K, 12L and storing the transaction data in the database. The computer also establishes a player rating associated with each player as a function of the wager data and the transaction data.

In one embodiment of the present invention, the transaction data includes a device type of the non-gaming machine 12J, 12K, 12L, an identifier of the non-gaming machine, and the estimated profit of the non-gaming machine. The transaction data may also include a patron ID and a date/time stamp.

In one embodiment, the wager data and the transaction data are stored in a table in the database. In another embodiment, the wager data is stored in a first table in the database and the transaction data is stored in a second table in the database.

In one embodiment, the server 18, in establishing the player rating, performs the following steps:

(a) establishes a first percentile ranking for each patron relative to the other patrons as a function of the wager and transaction data for a first predetermined time period in each of a plurality of criteria, (b) establishes a first valuation number as a function of the percentile rankings in each of the plurality of criteria and a plurality of predetermined weighting factors, (c) establishes a second percentile ranking for each patron relative to the other patrons as a function of the wager and transaction data for a second predetermined time period in each of the plurality of criteria, and (d) establishes a second valuation number as a function of the percentile rankings in each of the plurality of criteria and the plurality of predetermined weighting factors.

As discussed above, the server 18 may combines the first and second valuation numbers into an overall valuation number. Furthermore, the system 10 may establish additional valuation numbers for different time periods, for example, the previous month, the previous three months, the previous year, and lifetime, i.e., all available data.

In one embodiment, the criteria includes recency, frequency, monetary value, and profit margin. Recency refers to the most recent or last visit to the resort by the player as determined by the last use of one of the devices 12. Frequency refers to the number of visits or uses by the player or patron's use of the devices. The monetary value is the amount spent and wagered by the player/patron during the time period. The profit margin is a value determined by multiplying the amount wagered or spent multiplied by the theoretical win or the estimate profit percentage of the gaming machine 12A-12I or non-gaming machine 12J, 12K, 12L. This determined for each wager and transaction and then added together.

In one embodiment, the wager data and the transaction data are stored in a single table in the database or in separate tables. However in one embodiment, even if the data is stored in two different tables, the fields of the table are the same. It should be noted that each wager and each transaction is stored as a separate record. The fields of the table(s) are listed below for an exemplary table which is used for both gaming and non-gaming machines 12.

RATINGID: Unique identifier for a patron rating.

PCALCID: Unique system generated numeric identifier for a point calculation formula PTNID: Unique system generated numeric identifier for a patron CARDID: Unique system generated numeric identifier for a patron card DEVTYPID: Device Category such as, Gaming Device, Table, Hotel, Spa, Point of Sale, or other interfaced third party system DEVID: Unique numeric identifier for a device (individual gaming device, Table, Hotel, gift shop, buffet, etc (individual profit center)

GAMEID: Subcategory of the device such as the individual game, type of table, terminal or item of the Gaming Device, Table, Hotel, Spa, Point of Sale or other interfaced third party system GAMETHEHOLDPCT: Margin percentage of the subcategory STATUS: Unique numeric identifier for a patron status Used as same THEOWIN: Estimated Profit (customer spend*margin percentage)

DATETIMEIN: Starting date and time of wager/transaction

DATETIMEOUT: Ending date and time of wager/transaction

TOTBUYIN: Total amount of buy in for wager machines 12A-12I; Customer spend for transaction for non-gaming machines 12J-12L GSTID: Unique system generated numeric identifier for a game site SHIFTID: Unique system generated numeric identifier for a casino shift YYYYINSERTED: The four digit year the record was created on MMINSERTED: The month the record was created on DDINSERTED: The day of the month the record was created on DATEINSERTED: The gaming days date that this transaction or event occurred LASTMODDATE: Timestamp of last modification LASTMODBY: Login name of person who last modified this record Industrial Applicability In a typical casino management system, the table in the database would house gaming ratings. In the present invention, the system stores point of sale transactions related to point redemption and/or earnings. The present invention allows the use of this existing table to handle the "rating" of non-gaming activity. In short, this is done by utilizing the existing interface for point of sale/hotel to capture spend, multiply it by the terminal's margin, and store the estimated profit in the existing theoretical win column. This way, all activity (gaming and non-gaming) can be captured and stored without the need for a separate data warehouse or repository or an extract method to migrate data.

Once the player/patron rating values are determined, the casino may use the data for various marketing or player comp purposes. These could include, but are not limited to:

1. Analysis of an individual patron over time
2. Analysis of a group over time (using average score of the group)
3. Comparative analysis of one group/individual against another [over time or for a specific period]
4. Resolution dispute, updating internal business protocols using the score to determine the nature of the resolution
5. Patron hosting and VIP analysis—to use worth score to determine who should qualify to be a VIP and/or hosted. That analysis could be performed in period report or as a "real-time" on the floor discovery of active patrons currently playing machines
6. To create better segmentation models, using worth as a criteria element. This could replace or enhance existing methodologies that may only use traditional metrics such as theoretical win, average daily theoretical, or coin in/turnover
7. To better determine reinvestment activities based on worth. By way of example, if a property provided parking discounts based on lifetime or periodic worth, the property could use the score as a matrix to determine percentage discount (e.g. everyone with a score above 90 for the period gets 100% discount, 75-89 score gets 50% discount, etc.)
8. Reinvestment, as denoted above, may have had to do with the amount of the reward. It can also be the timing of the reward. For example, if the patron's score is increasing, possibly invest less monies and with less frequency due to human nature dictating that this person is in an "upswing". If the patron's score is decreasing, the inverse is true and the business/property would examine the impact of increasing the amount and/or frequency of certain reinvestment strategies to re-capture that patron's activity potential
9. As an additional factor in determining the issuance of markers and credit limits
10. To evaluate scores as a relationship of market area
11. To determine if an individual player development manager or host has greater impact than another peer in increasing and/or retaining a greater overall score for the patron's assigned to that individual
12. To analyze score in relationship to seasonality, business growth (e.g. new verticals such as hotel or general expansion), competitor influence, shift, and any other internal or external factor that could contribute to a shift in the number of patrons within a given scoring range.

Obviously, many modifications and variations of the present invention are possible in light of the above teachings. The invention may be practiced otherwise than as specifically described within the scope of the appended claims.

What is claimed is:

1. A system, for tracking patron events at a plurality of devices, the plurality of devices including electronic gaming machines and non-gaming machines, each game device having a value associated therewith, the value associated with the electronic gaming machines being a theoretical hold of the respective electronic gaming machine, and the value associated with the non-gaming machines being an estimated profit percentage of the respective non-gaming machine, comprising:

a plurality of player tracking devices, each player tracking device being associated with one of the electronic gaming machines, the player tracking devices for identifying patrons interacting with the system, for tracking wagers made by the patrons on the electronic gaming machines and for recording wager data associated with each wager made by the players and a respective electronic gaming machine, the wager data including a device type associated with respective gaming machine, an electronic gaming machine identifier, and an amount of the respective wager; and, a server in communication with the player tracking devices for receiving the wager data associated with the one of the patrons and the respective gaming machine from the player tracking device and storing the wager data in a database and for establishing a first player rating as a function of the wager data and the theoretical hold percentage associated with the respective gaming machine, the server being in communication with the non-gaming machines for receiving transaction data associated with a transaction associated with the one of the patron's use of the non-gaming machines and storing the transaction data in the database, the transaction data including a device type associated with the respective non-gaming machine, an identifier of the non-gaming machine, and an amount of the transaction, the server configured to calculate a profit margin associated with the non-gaming machine transaction based on the transaction amount and the estimated profit percentage of the respective non-gaming machine for establishing a second player rating as a function of the transaction data and the calculated profit margin associated with the non-gaming machine transaction, the server for establishing a single player rating as a function of the first player rating and the second player rating.

2. A system, as set forth in claim 1, wherein the wager data and the transaction data are stored in a table in the database.

3. A system, as set forth in claim 1, wherein the wager data is stored in a first table in the database and the transaction data is stored in a second table in the database.

4. A system, as set forth in claim 1, wherein the wager data includes a player ID and a date/time stamp and the transaction data includes a patron ID and a date/time stamp.

5. A system, as set forth in claim 1, wherein the server, in establishing the player ratings, performs the following steps:
   (a) establishes a first percentile ranking for each patron relative to the other patrons as a function of the wager and/or transaction data for a first predetermined time period in each of a plurality of criteria, and
   (b) establishes a first valuation number as a function of the percentile rankings in each of the plurality of criteria and a plurality of predetermined weighting factors.

6. A system, as set forth in claim 5, wherein the server, in establishing the player ratings, performs the following steps:
   (a) establishes a second percentile ranking for each patron relative to the other patrons as a function of the wager and/or transaction data for a second predetermined time period in each of the plurality of criteria, and
   (b) establishes a second valuation number as a function of the percentile rankings in each of the plurality of criteria and the plurality of predetermined weighting factors.

7. A system, as set forth in claim 6, wherein the server combines the first and second valuation numbers into an overall valuation number.

8. A system, as set forth in claim 5, wherein the criteria includes recency, frequency, monetary value, and profit margin.

9. A system, as set forth in claim 6, wherein the first predetermined time period is a previous month and the second predetermined time period is a previous 3 months.

10. A method, for tracking patron events at a plurality of devices, the plurality of devices including electronic gaming machines and non-gaming machines, each game device having a value associated therewith, the value associated with the electronic gaming machines being a theoretical hold of the respective electronic gaming machine, and the value associated with the non-gaming machines being an estimated profit percentage of the respective non-gaming machine, comprising:

identifying patrons interacting with the gaming machines and tracking wagers made by the patrons on the electronic gaming machines;

recording wager data associated with each wager made by the patrons and a respective electronic gaming machine, the wager data including a device type associated with the respective gaming machine, an electronic gaming machine identifier, and an amount of the respective wager;

receiving the wager data associated with the one of the patrons and the respective gaming machine and storing the wager data in a database;

establishing a first player rating as a function of the wager data and the theoretical hold percentage associated with the respective gaming machine;

receiving transaction data associated with a transaction associated with the patron's use of the non-gaming machines and storing the transaction data in the database, the transaction data including a device type associated with the respective non-gaming machine, an identifier of the non-gaming machine, and an amount of the transaction;

calculating a profit margin associated with the non-gaming machine transaction based on the transaction amount and the estimated profit percentage of the respective non-gaming machine;

establishing a second player rating associated with each player as a function of the transaction data and the calculated profit margin associated with the non-gaming machine transaction; and establishing a single player rating as a function of the first player rating and the second player rating.

11. A method, as set forth in claim 10, wherein the wager data and the transaction data are stored in a table in the database.

12. A method, as set forth in claim 10, wherein the wager data is stored in a first table in the database and the transaction data is stored in a second table in the database.

13. A method, as set forth in claim 10, wherein the wager data includes a player ID and a date/time stamp and the transaction data includes a patron ID and a date/time stamp.

14. A method, as set forth in claim 10, wherein the steps of establishing the player rating, includes the steps of:
    (a) establishing a first percentile ranking for each patron relative to the other patrons as a function of the wager and/or transaction data for a first predetermined time period in each of a plurality of criteria, and
    (b) establishing a first valuation number as a function of the percentile rankings in each of the plurality of criteria and a plurality of predetermined weighting factors.

15. A method, as set forth in claim 14, wherein the steps of establishing the player rating, including the steps of:
    (a) establishing a second percentile ranking for each patron relative to the other patrons as a function of the wager and/or transaction data for a second predetermined time period in each of the plurality of criteria, and
    (b) establishing a second valuation number as a function of the percentile rankings in each of the plurality of criteria and the plurality of predetermined weighting factors.

16. A method, as set forth in claim 15, including the step of combining the first and second valuation numbers into an overall valuation number.

17. A method, as set forth in claim 14, wherein the criteria includes recency, frequency, monetary value, and profit margin.

18. A method, as set forth in claim 15, wherein the first predetermined time period is a previous month and the second predetermined time period is a previous 3 months.

19. A system, for tracking patron events at a plurality of devices, the plurality of devices including electronic gaming machines and non-gaming machines, each game device having a value associated therewith, the value associated with the electronic gaming machines being a theoretical hold of the respective electronic gaming machine, and the value associated with the non-gaming machines being an estimated profit percentage of the respective non-gaming machine, comprising:
    a plurality of player tracking devices, each player tracking device being associated with one of the electronic gaming machines, the player tracking devices for identifying patrons interacting with the system, for tracking wagers made by the patrons on the electronic gaming machines and for recording wager data associated with each wager made by the players and a respective electronic gaming machine, the wager data including a device type associated with respective gaming machine, an electronic gaming machine identifier, the theoretical hold percentage associated with the respective gaming machine, an amount of the respective wager, player ID and a date/time stamp; and,
    a server in communication with the player tracking devices and the non-gaming machines for receiving the wager data associated with the one of the patrons and the respective gaming machine from the player tracking device and storing the wager data in a database and, for receiving transaction data associated with a transaction associated with the patron's use of the non-gaming machines and storing the transaction data in the database, wherein the transaction data includes a device type of the non-gaming machine, an identifier of the non-gaming machine, the estimated profit margin of the non-gaming machine, a patron ID and a date/time stamp, the server configured to:
        determine a first player rating associated with one of the players based at least in part on the wager data;
        calculate a profit margin associated with the non-gaming machine transaction based on the transaction amount and the estimated profit percentage of the respective non-gaming machine;
        determine a second player rating associated with one of the players as a function of the transaction data; and
        determine a single player rating associated with each player based at least in part on the first and second player ratings, wherein the server, in determining the player rating, performs the following steps (a) establishes a first percentile ranking for each patron relative to the other patrons as a function of the wager and transaction data for a first predetermined time period in each of a plurality of criteria, wherein the criteria includes recency, frequency, monetary value, and profit margin, (b) establishes a first valuation number as a function of the percentile rankings in each of the plurality of criteria and a plurality of predetermined weighting factors, (c) establishes a second percentile ranking for each patron relative to the other patrons as a function of the wager and transaction data for a second predetermined time period in each of the plurality of criteria, (d) establishes a second valuation number as a function of the percentile rankings in each of the plurality of criteria and the plurality of predetermined weighting factors, and (e) combining the first and second valuation numbers into an overall valuation number.

* * * * *